Nov. 4, 1958     R. R. ENTWISTLE     2,858,697
FLUID FLOW GAGE
Filed April 26, 1954
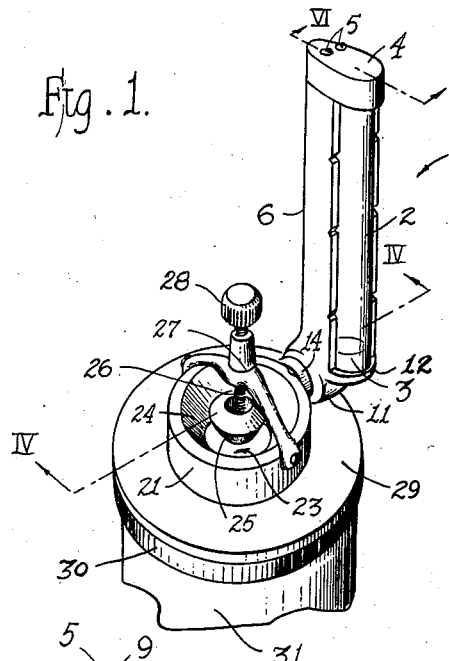
Fig. 1.
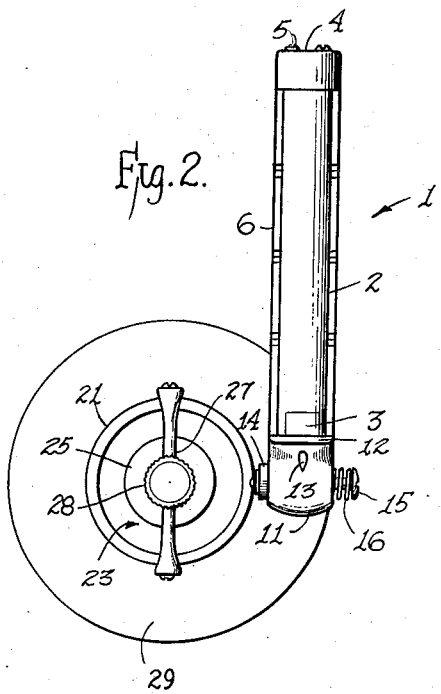
Fig. 2.
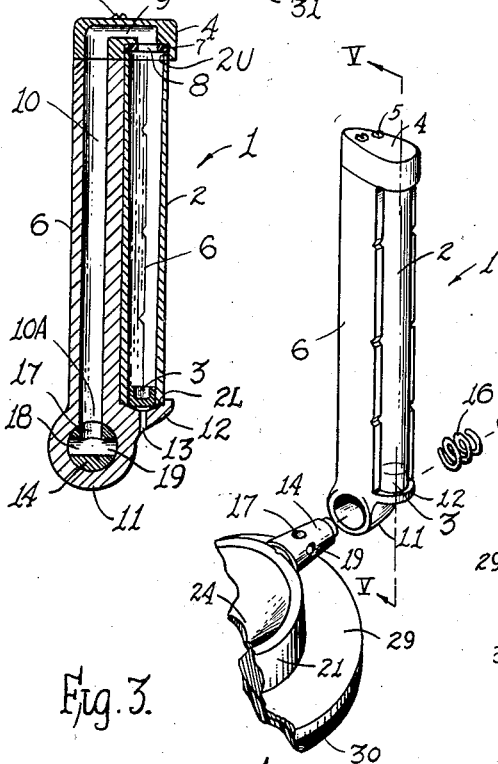
Fig. 3.
Fig. 6.
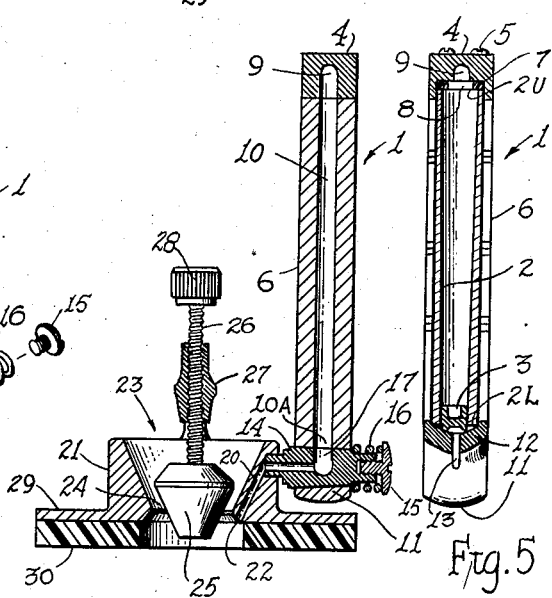
Fig. 4.     Fig. 5.
INVENTOR.
RAYMOND R. ENTWISTLE
BY R. W. Hodgson United States Patent Office 2,858,697
Patented Nov. 4, 1958

2,858,697

FLUID FLOW GAGE

Raymond R. Entwistle, Bell, Calif., assignor to D & R Manufacturing Co., Lynwood, Calif., a firm Application April 26, 1954, Serial No. 425,578

3 Claims. (Cl. 73—203)

Generally speaking, the present invention relates to the fluid flow gage art and, more particularly, it pertains to a novel adjustable fluid flow gage adapted for use in effectively comparing, for adjusting and balancing purposes, air flow into multiple throats of multiple carburetors associated with an internal combustion engine. In other words, this version of the present invention, in effect, could be said to comprise a vacuum comparator for comparing the relative vacuums in a plurality of carburetor throats to allow a mechanic to effectively adjust each of the carburetors so that they will all have virtually identical relative vacuums with respect to atmospheric pressure. This adjustment can be made for engine idling settings of the multiple carburetors and for higher speed settings of the multiple carburetors.

In order to facilitate the description of the present invention in this specification, substantial portions of this specification will refer to the invention in connection with the above-indicated specific version of the invention. However, it should be understood that this is done for convenience only, and that the invention is substantially broader than the specific type mentioned above.

At the present time, the use of twin (or dual- carburetors for supplying an air-vaporized gasoline mixture to an internal combustion engine (such as that employed in an automobile, truck or the like) is quite widespread. The so called "balancing" of such twin carburetors, or the attempt to adjust them to perform virtually identically, poses something of a problem. It is highly desirable that they be so "balanced" if optimum engine performance and gasoline mileage is to be realized. One way to effectively "balance" the carburetors is to adjust them until their interior throat pressures are virtually identical. However, this is quite difficult to do with prior art equipment because of the fact that said carburetor interior throat pressures may vary substantially from one internal combustion engine to another, thus necessitating the possession of a number of different manometers or vacuum gauges in order to cover the substantial range of variation of carburetor throat pressures or vacuums. Furthermore, most such vacuum gauges or manometers are relatively difficult to use, are costly, and are easily susceptible to damage. Also, any such prior art vacuum gauge or manometer having a substantial operating range will necessarily not be as sensitive as it should be at the precise value of vacuum being measured, to make it possible to balance the two carburetors with the necessary great accuracy for optimum performance of the internal combustion engine and for maximum gasoline economy.

With the above points in mind, it is an object of the present invention to provide a novel differential pressure comparator adapted for use in effectively comparing the differential pressure of one or more pressurized fluids and/or regions with respect to a reference pressure, such as ambient atmospheric pressure, for example, although not so limited.

It is a further object of the present invention to provide a relative vacuum comparator (primarily, though not exclusively) adapted for use in effectively comparing the internal relative vacuums of at least two carburetors with respect to ambient atmospheric pressure whereby to facilitate adjustment of said relative vacuums to virtually identical values for effectively "balancing" the multiple carburetors.

Other and allied objects will be apparent to those skilled in the art after a careful perusal, examination and study of the accompanying illustrations, the present specification, and the appended claims.

To facilitate understanding, reference will be made to the hereinbelow-described drawings, in which:

Fig. 1 is a perspective view of one illustrative embodiment of the present invention shown in operative relationship with respect to a fragmentary virtually vertical carburetor throat;

Fig. 2 is an elevation of the form of the invention shown in Fig. 1 positioned for operative relationship with respect to a virtually horizontal carburetor throat (not shown);

Fig. 3 is a fragmentary, exploded perspective view, similar in aspect to Fig. 1, showing the pressure responsive fluid motor means and the selectively adjustable mounting means for same in a horizontally exploded relationship with respect to a fragmentary, right-hand portion of the rest of the device;

Fig. 4 is a vertical sectional view through the entire device on the plane and in the direction indicated by the arrows IV—IV in Fig. 1;

Fig. 5 is a vertical sectional view taken in the direction of the arrows V—V in Fig. 3; and Fig. 6 is a vertical sectional view taken in the direction of the arrows VI—VI in Fig. 1.

Generally speaking, the present invention includes pressure responsive and indicating means cooperably arranged for removable effective communication (usually through a first communication means) with respect to a pressurized fluid. In one specific form, the pressure responsive means may comprise a piston chamber and a piston, and may be effectively provided with mounting means for mounting (usually adjustably mounting) the piston chamber with respect to the rest of the device.

In the specific embodiment illustrated, the pressure responsive means is indicated generally at 1 and comprises a longitudinal piston chamber which is normally vertically orientated and which is virtually circular in cross-section in any given horizontal plane. In the example illustrated, said piston chamber is defined by a wall 2 which is virtually circular in any given horizontal plane but which interiorly tapers from a first interior diameter adjacent the open lower end 2L of the piston chamber wall 2 to a slightly greater interior diameter adjacent the upper end 2U of the piston chamber wall 2.

In the specific example illustrated, the piston chamber 1 has mounted therein a freely reciprocatable piston 3, which normally, under the influence of gravity, would lie adjacent the lower end 2L of the piston chamber 2.

In the specific example illustrated, the upper open end 2U of the piston chamber 2 is effectively closed by a top closure member 4 fastened by suitable screw means 5 to a longitudinal, vertically oriented support member 6. In the specific example illustrated, the closure member 4 is provided with a resilient sealing gasket positioned immediately under the closure member 4 in forced resilient sealing contact with the upper open end wall 2U of the piston chamber 2. It should also be noted that the gasket 7 is provided with an aperture 8 communicating with a first variable volume chamber portion of the piston chamber 2, which is above the piston 3, and also communicating with a duct 9 in the closure member 4, which, in turn, communicates with a duct 10 extending longitudinally downwardly through the support member 6 to an orifice 10A in a tapered bearing member 11 carried by the bottom of the support member 6.

In the specific example illustrated, the support member 6 is provided with a bottom closure member 12 adapted to receive thereon the bottom open end wall 2L of the piston chamber 2, and to effectively communicate a second variable volume chamber portion of the piston chamber 2, which is below the piston 3, with ambient atmosphere through a second communication means comprising a hole 13 in the bottom closure member 12.

In the specific example illustrated, the tapered bearing 11 is adapted to be mounted on a mating, tapered male projection 14 and to normally be held thereon by a screw 15, screwed into the interiorly threaded end of the projection 14, and a biasing spring 16 positioned between the head of the screw 15 and the outer head of the bearing 11.

It should be noted that the male projection 14 is provided with a top orifice 17, a rear orifice 18 and a front orifice 19, all communicating with an interior bore 20 extending downwardly at an angle through a body member 21 to an orifice 22. The arrangement is such that the bearing 11 may be positioned with respect to the mating male projection 14, as shown in Fig. 1, with the orifice 10A in communication with the orifice 17, or the bearing 11 may be rotated through virtually 90 degrees with respect to the axis of the male projection 14, into the position shown in Fig. 2 with the orifice 10A in communication with the rear orifice 18, or said 90 degree rotation may be in the opposite direction, whereby to place the orifice 10A in communication with the front orifice 19.

In any of these three positions, the biasing spring 16 will effectively force the tapered bearing 11 onto the correspondingly tapered male projection 14 whereby to effectively seal the junction of the communicating orifices therebetween. It will be noted that irrespective of which of the three positions the bearing 11 is in with respect to the male projection 14, the orifice 22 is effectively communicated with the upper or first chamber portion of the piston chamber 2 above the piston 3. The ducting, orifices and apertures bringing this about comprise one specific form of the first communication means hereinbefore-generically-referred-to.

The support member 6 (and its two closure members), the bearing 11, the male projection 14, the screw means 15 and the biasing spring 16 comprise one specific form of the mounting means for vertically (and adjustably) mounting the fluid motor means, as hereinbefore-generically-referred-to.

Also, generally speaking, the present invention may also include selectively adjustable pressure modifying means arranged to effectively modify the pressure transmitted through the first communication means to the pressure responsive and indicating means to an optimum value within the normal operating range of the pressure responsive and indicating means. In one specific embodiment, this may take the form of adjustably openable and closable port means communicating a reference pressure and the pressurized fluid adjacent the first communication means.

In the specific example illustrated, the port means is indicated generally at 23 and includes a tapered valve seat 24 within the body 21 adapted to cooperate with a similarly tapered valve member 25 carried at the lower end of a longitudinally vertically arranged threaded member 26, which is threadedly engaged within an interiorly threaded carrying member 27, which extends across the opening at the top of the tapered valve seat 24, and which is fastened at each of its ends to the exterior of the body member 21 by suitable fastening means. The arrangement is such that a knurled knob 28, at the upper end of the threaded longitudinal member 26, can be manually rotated in one sense to cause the valve 25 to move toward the valve seat 24 for adjustably closing the port 23 to any desired degree, or the knob 28 can be rotated in the opposite sense to cause the valve 25 to move away from the seat 24 to adjustably open the port 23 to any desired degree. Incidentally, it should be noted that the orifice 22 of the first communication means communicates with the port 23 below the fully inserted position of the valve 25.

The specific form of the present invention illustrated, includes a flat annular base plate 29, carried by the bottom of the body member 21, and a similar underlying annular gasket 30 of compliant material, such as rubber, or the like, adapted to be pressed into sealing contact with the open end of a carburetor throat (or the like), such as is indicated in fragmentary form at 31.

The operation of the device may be, very briefly, described as follows. The device is placed in operative relationship with respect to a carburetor throat, such as is indicated in fragmentary form at 31. Then the mechanic allows the internal combustion engine, associated with the carburetor (and not shown), to idle. The mechanic then observes the piston 3 in the tapered piston chamber 2 through the wall 2 thereof (at least a portion of which is transparent or translucent) to determine whether it remains at the bottom of the piston chamber 2 resting on the closure member 12, or whether it is lifted virtually completely to the upper end of the piston chamber 2 against the gasket 7. In the first case, he knows that insufficient vacuum is being transmitted to the piston chamber 2 above the piston 3 and, therefore, he will rotate the knob 28 so as to move the valve 25 toward the valve seat 24. This partial closing of the port 23 will effectively modify (decrease) the pressure (or increase the vacuum) transmitted to the piston chamber 2 above the piston 3 until said vacuum is within the operating range of the device and will cause the piston 3 to be lifted and maintained in a position somewhere in the middle region of the piston chamber 2 but not at the top or the bottom thereof. In the second case mentioned above, the mechanic knows that excessive vacuum is being transmitted to the piston chamber 2 above the piston 3 and, therefore, he will rotate the knob 28 so as to move the valve 25 away from the valve seat 24. This partial opening of the port 23 will effectively modify (increase) the pressure (or decrease the vacuum) transmitted to the piston chamber 2 above the piston 3 until said vacuum is within the operating range of the device and will cause the piston 3 to be lifted and maintained in a position somewhere in the middle region of the piston chamber 2 but not at the top or the bottom thereof.

After the above adjustment into the proper operating range has been completed, the mechanic then lifts the entire device off of the carburetor throat 31 and places the entire device in operative relationship with respect to a second carburetor associated with the same engine. He then observes the position of the piston 3. If it is virtually identical to its former position, when the entire device was in operative relationship with respect to the first carburetor throat, then he knows that the two carburetors are very accurately balanced (at engine idling speed). However, if the piston 3 does not assume the same position as it formerly did when testing the first carburetor, the mechanic knows that the two carburetors are not balanced, and he will make appropriate adjustment (usually of the second carburetor, although not so limited) by the carburetor adjusting means customarily provided with carburetors, until the piston 3 is virtually identically positioned by either carburetor. He will then know that the two carburetors are very accurately balanced (at engine idling speed).

After the above operation has been completed, the mechanic will normally cause the engine to run at substantially higher speed, and will repeat the above described testing operation in connection with both of the carburetors. However, in this case, he customarily adjusts the carburetors to balanced condition by adjusting the mechanical linkages connecting both of the carburetors with respect to the fuel throttle (usually an accelerator pedal, in the case of an automobile) whereby to cause the carburetors to be fueled in precisely the same manner. The twin carburetors are then precisely balanced for virtually all conditions of use.

It should also be noted that the present invention is capable of balancing use in association with carburetors having lateral or horizontal throats—this is illustrated in Fig. 2, and is thought to require no further explanation.

Numerous modifications and variations of the present invention will occur to those skilled in the art after a careful study hereof. All such properly within the basic spirit and scope of the present invention are intended to be included and comprehended herein as fully as if specifically described, illustrated and claimed herein.

For example, the pressure responsive and indicating means may be modified substantially from the specific form illustrated herein. It may take a form having a non-tapered piston chamber. It may also take a form utilizing means other than gravity acting upon the mass of the piston to bias the piston (such as spring means or the like). In such case, the piston chamber need not be vertically oriented, and the rotatably adjustable mounting means may be modified or eliminated entirely. Furthermore, diaphragm means may be employed in lieu of the piston (or other pressure responsive means may be employed).

Also, the indicating aspect of the present invention may take a form other than the transparent or translucent wall 2 of the piston chamber (such as glass, acrylic resin, or the like) which allows visual observation of the position of the piston. Other types of indication or other indicating means may be employed.

The pressure modifying means may also be substantially varied within the scope of the present invention, as may the means for coupling the device to pressurized fluid or region which is to be tested.

Incidentally, it should be noted that the term "reference pressure," as used herein, can be ambient atmospheric pressure or any other desired pressure—any value of positive pressure, any value of negative pressure, or anything therebetween.

It should also be noted, that under certain circumstances the two communication means may be effectively transposed with respect to the first and second chamber portions. Also, under certain circumstances, said first and second chamber portions may be effectively transposed.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claims only, with due consideration for the doctrine of equivalents.

I claim:

1. A device for studying air flow into an inlet of an internal combustion engine, comprising a body adapted for sealing engagement with such inlet, said body being formed with an opening therethrough defining on its upper side a tapered valve seat, a tapered plug for said seat having a stem extending upwardly from and mounted on said body for adjustment of said plug vertically relative to said sheet, said body being further provided with a passageway leading from the lower side of said body within said inlet area and terminating in a socket facing generally at right angles to said stem, a projection having a passageway therein connected to said socket, and a transparent internally tapered tube having a flow responsive piston therein pivotally mounted on said projection in communication with the passageway therein to swing in a plane parallel with said valve stem.

2. A device for studying air flow into any of a plurality of hollow carburetor throats of an internal combustion engine, comprising a body provided with a resilient carburetor throat engaging member adapted for resilient abutting and sealing engagement with any one of such plurality of hollow carburetor throats, said body being formed with an opening therethrough defining on its upper side a tapered valve seat, a tapered plug for said seat having a stem extending upwardly from and mounted on said body for adjustment of said plug vertically relative to said seat, said body being further provided with a passageway leading from the lower side of said body within the area of said inlet terminating in a projection extending from said body generally at right angles to said stem, and a transparent internally tapered tube internally larger at the top than at the bottom thereof and having an upward-flow-responsive piston therein, said tube having its bottom in communication with the passageway in said projection and pivotally mounted on said projection to swing in a plane parallel with said valve stem.

3. A device for studying air flow into any of a plurality of hollow virtually cylindrical carburetor throats of an internal combustion engine, comprising a body provided at the bottom thereof with an annular resilient carburetor throat engaging member adapted for resilient abutting and sealing engagement with the virtually circular end of any one of such plurality of hollow virtually cylindrical carburetor throats, said body being formed with an opening therethrough defining on its upper side a tapered valve seat, a tapered plug for said seat having a stem extending upwardly from and mounted on said body for adjustment of said plug vertically relative to said seat, said body being further provided with a passageway leading from the lower side of said body within the area of said inlet terminating in a projection extending from said body generally at right angles to said stem, a transparent internally tapered tube internally larger at the top than at the bottom thereof and having an upward-flow-responsive piston therein, said tube having its bottom in communication with the passageway in said projection and pivotally mounted on said projection to swing in a plane parallel with said valve stem, and visual observation means visually indicating slidable reciprocation of the piston within the transparent internally tapered tube.

References Cited in the file of this patent

UNITED STATES PATENTS

| | | |
|---|---|---|
| 1,051,931 | Waindzioch | Feb. 4, 1913 |
| 1,456,621 | Chadwick | May 29, 1931 |
| 2,303,532 | Ewart et al. | Dec. 1, 1942 |
| 2,311,238 | MacKinnon | Feb. 16, 1943 |
| 2,370,634 | Brewer | Mar. 6, 1945 |
| 2,494,936 | Edelen | Jan. 17, 1950 |
| 2,707,879 | Dwyer | May 10, 1955 |

FOREIGN PATENTS

| | | |
|---|---|---|
| 138,357 | Germany | Feb. 5, 1903 |
| 332,024 | Germany | Sept. 23, 1919 |
| 468,977 | Germany | Nov. 9, 1924 |